US006725630B2

(12) United States Patent
Rea et al.

(10) Patent No.: US 6,725,630 B2
(45) Date of Patent: Apr. 27, 2004

(54) METHOD FOR INDUCTION SEALING A PLASTIC PART TO A COMPOSITE CONTAINER

(75) Inventors: Keith R. Rea, Florence, SC (US); Charles M. Braddock, Hartsville, SC (US); Floyd Boatwright, Hartsville, SC (US); J. Mark Morrow, Camden, SC (US); James A. Lowry, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/991,227

(22) Filed: Nov. 15, 2001

(65) Prior Publication Data

US 2003/0089079 A1 May 15, 2003

(51) Int. Cl.⁷ ................................................ B65B 51/10
(52) U.S. Cl. ........................ 53/478; 53/471; 53/329.3; 53/329.4
(58) Field of Search ................................ 53/478, 329.3, 53/329.4, 471

(56) References Cited

U.S. PATENT DOCUMENTS

| | | | | |
|---|---|---|---|---|
| 2,777,041 A | * | 1/1957 | Dustman | 219/672 |
| 2,937,481 A | * | 5/1960 | Palmer | 53/471 |
| 3,142,371 A | * | 7/1964 | Rice et al. | 198/394 |
| 3,604,880 A | * | 9/1971 | O'Neil | 219/633 |
| 3,611,662 A | * | 10/1971 | Schmitt | 53/94 |
| 3,652,361 A | | 3/1972 | Leatherman | |
| 3,710,937 A | * | 1/1973 | Cook | 209/523 |
| 3,738,892 A | | 6/1973 | Curcio | |
| 3,833,110 A | * | 9/1974 | Riggs | 198/459.4 |
| 3,879,247 A | * | 4/1975 | Dickey | 156/272.4 |
| 3,973,719 A | * | 8/1976 | Johnson et al. | 229/5.6 |
| 4,266,651 A | * | 5/1981 | Strom | 198/345.1 |
| 4,272,945 A | * | 6/1981 | Obrist | 53/557 |
| 4,290,519 A | * | 9/1981 | Harvey | 198/467.1 |
| 4,340,801 A | | 7/1982 | Ishibashi et al. | |
| 4,539,456 A | | 9/1985 | Mohr | |
| 4,704,509 A | | 11/1987 | Hilmersson et al. | |
| RE33,467 E | | 12/1990 | Steck et al. | |
| 5,248,864 A | | 9/1993 | Kodokian | |
| 5,250,140 A | | 10/1993 | Hayashi et al. | |
| 5,340,428 A | | 8/1994 | Kodokian | |
| 5,406,772 A | * | 4/1995 | Dinius | 53/67 |
| 5,649,407 A | | 7/1997 | Blomqvist | |
| 5,712,042 A | | 1/1998 | Cain | |
| 5,736,719 A | * | 4/1998 | Lawson et al. | 219/769 |
| 5,858,141 A | | 1/1999 | Repp et al. | |
| 5,889,263 A | | 3/1999 | Andersson | |
| 5,968,399 A | | 10/1999 | Selberg | |
| 6,131,754 A | | 10/2000 | Smelko | |
| 6,196,450 B1 | * | 3/2001 | Varadarajan et al. | 229/123.2 |

FOREIGN PATENT DOCUMENTS

| | | |
|---|---|---|
| JP | 01254506 A | 10/1989 |
| JP | 02180124 A | 7/1990 |
| JP | 04019139 A | 1/1992 |
| JP | 06024406 A | 2/1994 |

* cited by examiner

*Primary Examiner*—John Sipos
*Assistant Examiner*—Louis Tran
(74) *Attorney, Agent, or Firm*—Bullwinkel Partners, Ltd.

(57) ABSTRACT

A method for induction sealing a plastic part to a composite container using a pair of linear coils electrically connected to low frequency generators. The linear coils produce overlapping electromagnetic fields on either side of the container. Rotating the container assures even heating of the polyethylene liner and plastic part. The method produces a reliable seal between the liner and plastic part and can be used at high production speeds.

11 Claims, 2 Drawing Sheets

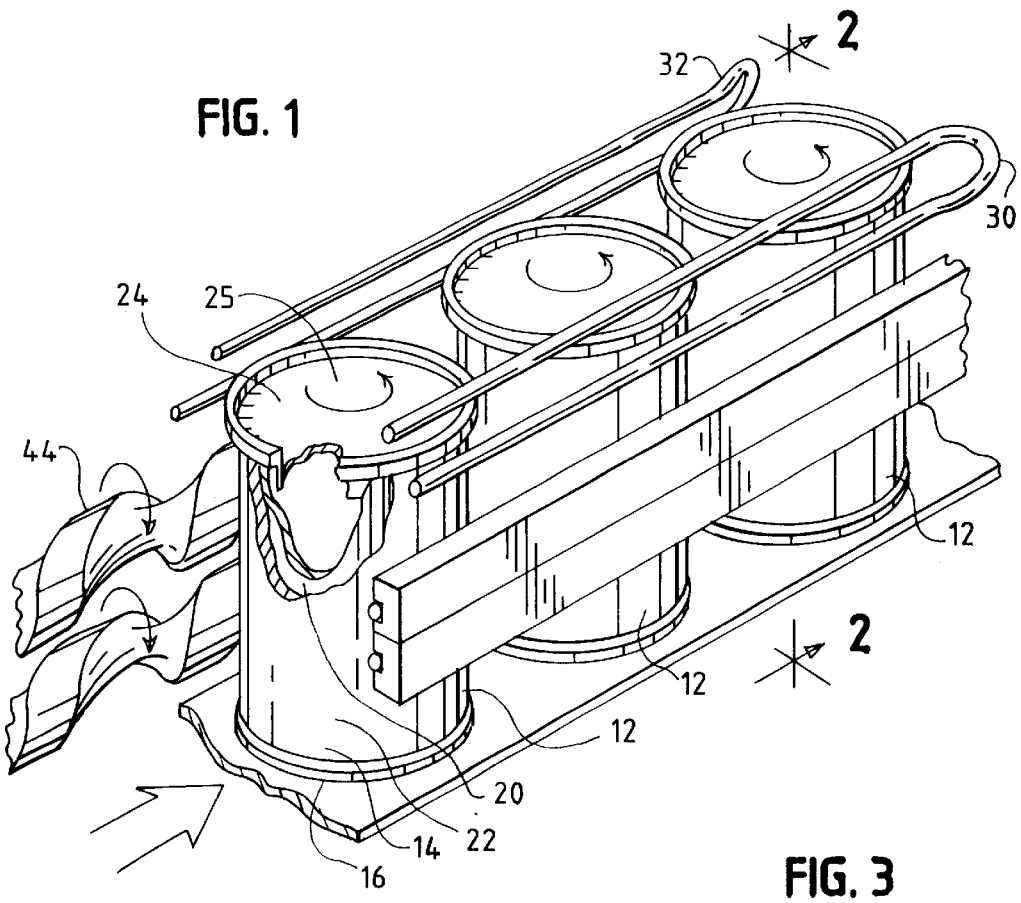
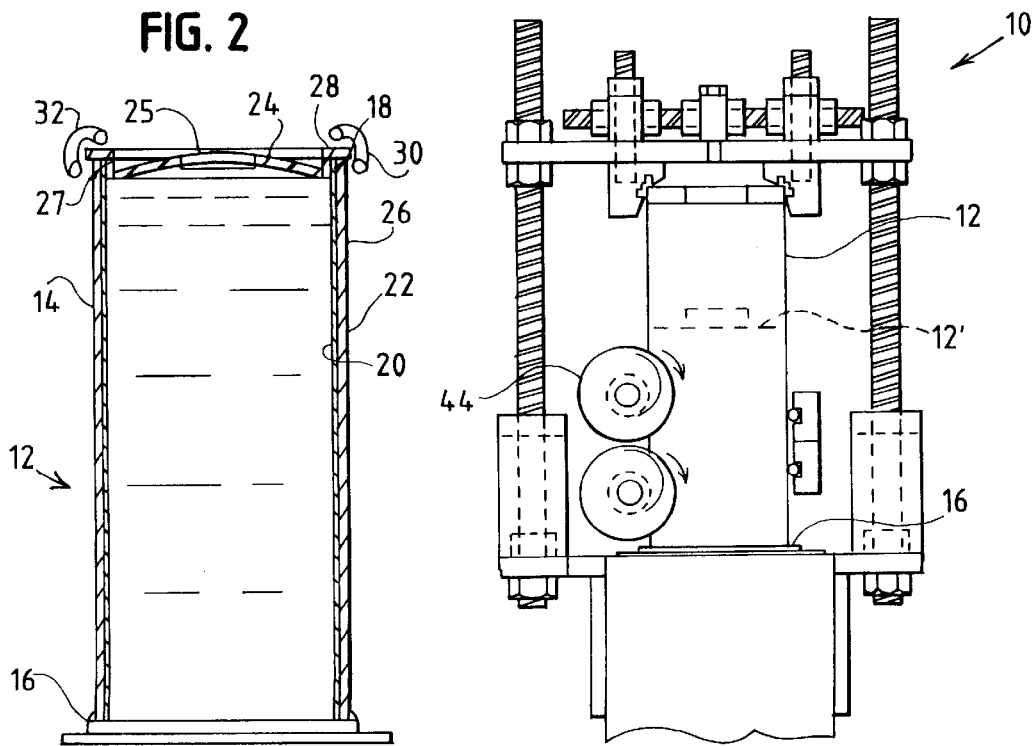

US 6,725,630 B2

METHOD FOR INDUCTION SEALING A PLASTIC PART TO A COMPOSITE CONTAINER

BACKGROUND

1. Field of the Invention

This patent relates to a method for attaching a plastic part to a composite container using induction heating. More particularly, this patent relates to a method for induction sealing a plastic part to a composite container by positioning the plastic part onto the top portion of the container and exposing the top portion of the container to electromagnetic fields generated by a pair of linear shaped coils.

2. Description of the Related Art

Composite containers are commonly used to hold drink mixes, snacks and other foods. A typical composite container has a cylindrical body, a plastic or metal bottom and a plastic overcap. The container body is comprised of a polyfoil inner liner, a paperboard structural layer and a paper outer label. The polyfoil inner layer has a moisture-proof thermoplastic layer that contacts the container contents, a metallic foil layer adjacent the thermoplastic layer, and an outer paper layer. A plastic seal may be positioned under the plastic cap and sealed to the top edge of the container to help maintain the freshness of the contents and extend its shelf life. Alternatively, the plastic cap may be sealed directly to the container body.

Sealing a plastic seal or cap to a composite container body is often accomplished by heating the plastic seal or cap while pressing it onto the container body. Various means of heating the plastic seal or cap are known, including radiant heating and conductive heating, but the most successful means, at least with respect to composite containers, is induction heating.

Induction heating is a process that relies on electrical currents within a material to produce heat. Induction heating requires a source of electrical energy, an induction coil and an electrically conductive target material (the material to be heated). As electricity passes through the induction coil, an electromagnetic field is generated around the coil. The shape of the electromagnetic field depends on the shape of the coil. When the target material is exposed to the electromagnetic field, eddy currents are created in the target material, causing the target material to heat up because of resistance losses. The heat from the target material is transferred to adjacent plastic materials, causing them to soften and fuse together. The plastic materials form a seal upon cooling.

When sealing a plastic cap onto a composite container, it is desirable to obtain a broad seal to prevent breaching of the seal. A broad seal is defined as a seal at least ¼ inch wide, and preferably at least ½ inch wide. It is also desirable to be able to seal containers at high production speeds. High production speed is defined as at least 100 containers per minute. Unfortunately, most commercially available induction sealing machines provide extremely localized heating. As a consequence, it is difficult to obtain a broad seal between a plastic part and a composite container at high production speeds.

Thus, it is an object of the present invention to provide a method and apparatus for induction sealing a plastic part to a composite container.

Another object is to provide a process for forming a broad seal between a plastic part and a composite container at faster speeds than conventional induction sealing processes.

Further and additional objects will appear from the description, accompanying drawings, and appended claims.

SUMMARY OF THE INVENTION

The present invention is a method and apparatus for induction sealing a plastic part to a composite container. The method includes the steps of:

providing a composite container having a body, the body having a top portion terminating in a top edge, the body defining a cylinder extending beyond the top edge, the body comprising an outer structural layer, an intermediate layer of electrically conductive material and an innermost layer of thermoplastic adjacent the electrically conductive layer;

positioning a plastic part onto the composite container such that it forms a friction fit with the inside of the top portion of the container body;

exposing the top portion of the container body to a pair of electromagnetic fields created by a pair of induction coils arranged in parallel on either side of the container, each coil doubling back on itself so as to form two substantially parallel linear sections, one linear section of each coil being positioned above the container top edge and intersecting the cylinder defined by the container body, the other linear section being positioned below the top edge and lateral to the container body, whereby said exposure induces an electrical current in the electrically conductive layer of the container body, thereby generating heat that raises the temperature of the adjacent thermoplastic layer to a temperature suitable for adhering the thermoplastic layer to the plastic part;

rotating the container while it is being exposed to the electromagnetic fields; and forming a seal between the plastic part and the thermoplastic inner layer of the container by removing the top portion of the container from the electromagnetic fields and allowing the thermoplastic layer to cool and solidify.

The parallel linear sections of each coil create overlapping electromagnetic fields. As the container is exposed to the overlapping electromagnetic fields, the container is carried on a moving conveyor belt and rotated to assure even heating of the thermoplastic liner and plastic part.

THE DRAWINGS

FIG. 1 is a perspective view of a detail of an induction sealing apparatus used in the present invention, showing three composite containers as they are conveyed through the apparatus.

FIG. 2 is a cross sectional view taken along line 2—2 of one of the containers of FIG. 1.

FIG. 3 is an end plan view of the induction sealing apparatus of FIG. 1.

DETAILED DESCRIPTION OF THE INVENTION

Figure 4:
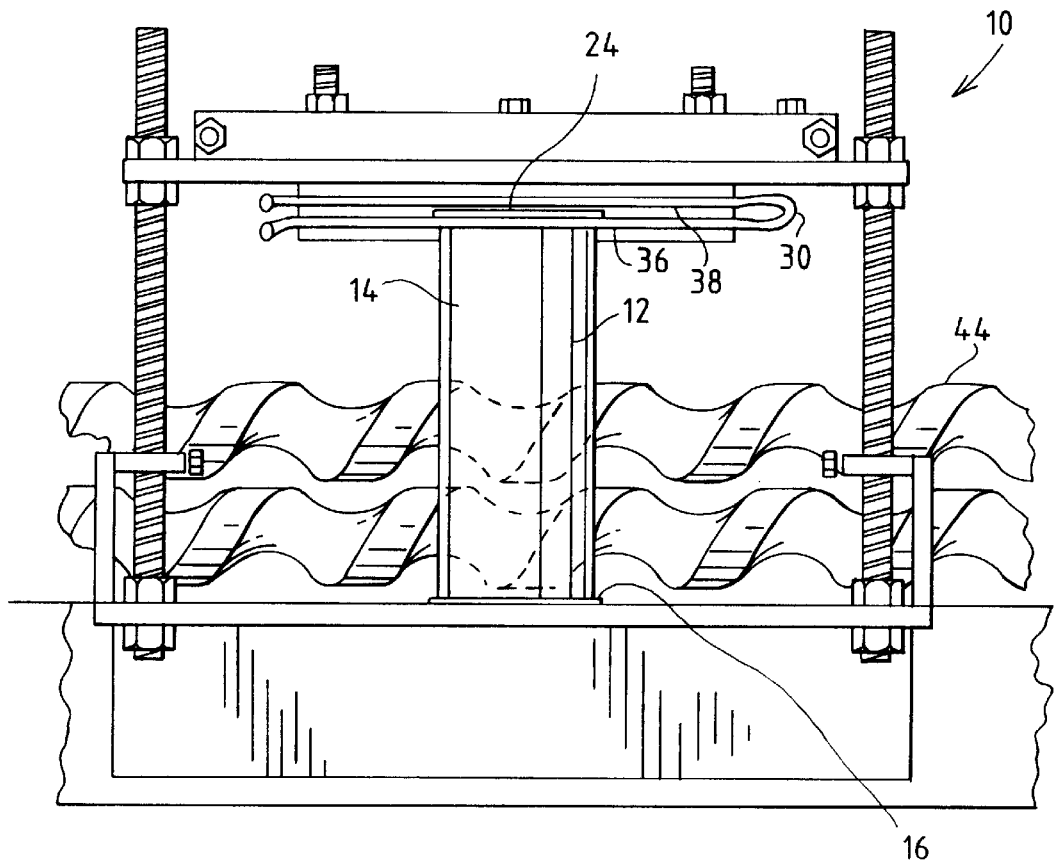
FIG. 4 is a side plan view of the induction sealing apparatus of FIG. 1.

The present invention is a method for induction sealing a plastic part, such as a lid, to a composite container. In brief summary, the method involves the following steps. First, a composite container is provided having a foil layer and an adjacent thermoplastic inner layer. The plastic part is positioned onto the top portion of the container so that it forms a friction fit with the thermoplastic inner layer. The container and plastic part are then passed through an induction sealing apparatus via a conveyer belt or other suitable means. As the container passes through the induction sealing apparatus, the top portion (¼"–½") of the container is exposed to two pairs of overlapping electromagnetic fields created by a pair of linear induction coils electrically connected to alternating current generators and positioned on opposite sides of the container. The electromagnetic fields induce eddy currents in the foil layer, causing the foil to heat up. The foil heats the adjacent thermoplastic layer and may also heat the plastic part, causing the thermoplastic layer and plastic part to soften and fuse together. Finally, the thermoplastic layer and plastic part are cooled, forming a seal between the two.

Turning to the figures, there is shown in FIG. 1 a perspective view of a detail of an induction sealing apparatus 10 used in the present invention. The figure shows three composite containers 12 being conveyed through the induction sealing apparatus 10. As perhaps best shown in FIG. 2, each container 12 comprises a cylindrical body portion 14 and a bottom 16. The bottom 16 may be made from plastic, metal or any other suitable material. The body 14 has an open top end (before a cap 24 is positioned onto the container) and terminates in a top edge 18. The body wall 14 comprises a polyfoil inner liner 20 and a paperboard structural outer layer 22. An optional printed-paper label (not shown) may be wrapped around the paperboard layer 22 and adhered thereto.

The polyfoil inner liner 20 typically comprises, from the inside out, a thermoplastic layer (typically polyethylene or polypropylene), an electrically conductive layer (typically a metallic foil such as aluminum foil), a second thermoplastic layer and a paper layer, the paper layer adjoining and bonded to the paperboard structural layer 22 of the container body 14. For the purposes of the description and claims to follow, the cylinder defined by the container body 14 may be thought of as extending beyond the top edge 18 of the body 14.

A plastic part 24 is positioned onto the composite container 12 such that the plastic part 24 forms a friction fit with the inside of the top portion 26 of the container body 14. The plastic part 24 may be a lid, as in the illustrated example, and may have incorporated into its design such features as a spout, sifting holes or other dispensing feature. As best shown in FIG. 2, the plastic part 24 has a covering portion 25 and a sidewall 27 extending downward from the covering portion 25. The outer diameter of the sidewall 27 is only slightly smaller than the inner diameter of the container body 14 to provide good radial contact between the plastic part 24 and the cylindrical body 14. The plastic part 24 has an annular flange 28 extending radially from the sidewall 27 that abuts the top edge 18 of the container 10 when the plastic part 24 is fully seated on the container 10.

Critical to the success of the method is the unique form and placement of the induction coils 30, 32. Known methods for induction sealing parts, such as that disclosed in Japanese Patent Application Number 02125767, use serpentine coils placed above the mouth of the container. This serpentine configuration is commonly used for induction sealing prescription medicine bottles and caps. However, serpentine coils can result in hot spots in the metal foil, which can cause scorching of the paper layers and a poor seal.

The present method uses a linear coil configuration. Although the method would work with a single linear coil, a pair of coils 30, 32 arranged in parallel on either side of the container 12 is preferred for faster sealing and thus increased productivity. Each coil doubles back on itself to form two substantially parallel linear sections. For example, the right side coil 30 in FIG. 1 has a first linear section 36 and a second linear section 38 substantially parallel to the first. Preferably, the linear sections 36, 38 are about sixteen inches long, and are electrically connected to an alternating current generator. Each coil may be electrically connected to its own generator.

Figure 5:
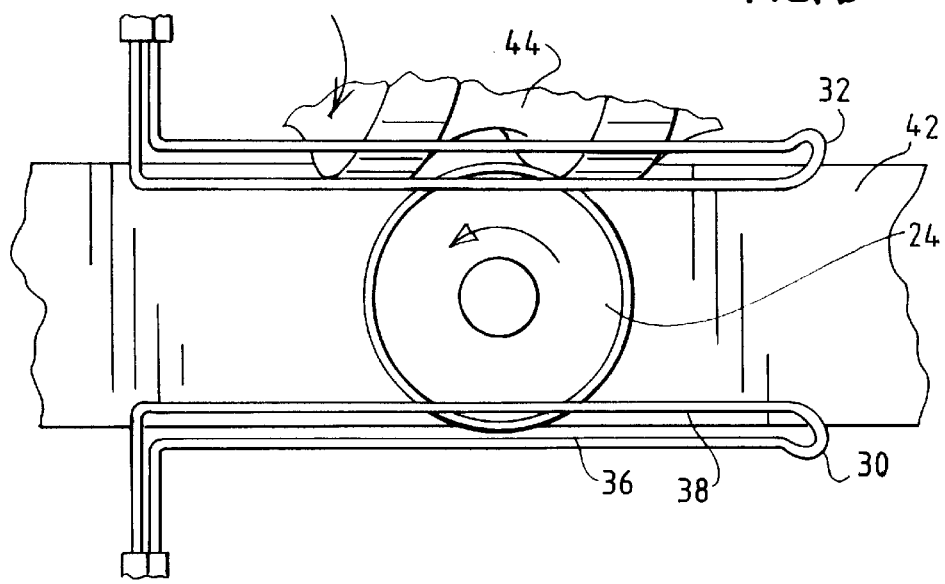
FIG. 5 is a top plan view of the induction sealing apparatus of FIG. 1.

The linear sections of each coil 30, 32 create overlapping electromagnetic fields that allow for more even heating of the polyfoil inner liner 20, and thus, less chance of scorching. To achieve a ¼"–½" wide seal, each coil 30, 32 preferably is arranged such that one length of the coil is located about ¹⁄₁₀ inches above the plane defined by the top edge 18 of the container 12 and within the cylindrical area defined by the container body 14, as best shown in FIGS. 2 and 5. The other length of the coil is located about ¹⁄₁₀ to ¼ inches lower than this plane, as perhaps best shown in FIGS. 1 and 2.

FIGS. 3 and 4 show two views of an apparatus 10 for induction sealing a plastic part to of a container 12 according to the present invention. The containers 12 move along a conveyor belt 42 and are turned at least two times, and preferably about 2.1 times, by a screw drive 44 or other rotating means as they pass by the sixteen-inch long coils 30, 32. Because of the dual coil configuration, with every 180-degree turn of each container 12, the entire circumference of the container 12 near the top edge 18 is exposed to the electromagnetic energy fields generated by the coils 30, 32.

The coils may be raised or lowered to accommodate containers of varying heights. A relatively shorter container 12' is shown in phantom in FIG. 3 to demonstrate this capability.

EXAMPLE

Molded polyethylene plastic lids were sealed onto composite containers using an induction sealing apparatus. The containers had a body comprising a polyfoil inner liner, a structural layer made from recycled paper, and an outer label made from paper and bearing graphics. The polyfoil inner liner included a layer of aluminum foil 0.00035 inches thick. The plastic lids were positioned onto the composite container so that they formed a friction fit with the inside of the top portion of the container body.

Normally, thin foils such as 0.00035 inch-thick aluminum foil typically used in composite containers do not heat well with low frequency generators (generators that generate frequencies lower than 450 KHz). Surprisingly, we found that excellent bonding between the thermoplastic liner and the plastic part could be achieved using generators that generate frequencies in the range of 80–200 KHz, such as the 15 KW generators manufactured by Lepel Corporation.

The containers were placed on a conveyer belt and passed through the induction sealing apparatus. The apparatus comprised a pair of induction coils arranged in parallel. Each of the induction coils doubled back on itself and formed two substantially parallel linear sections about 16 inches long. One linear section of each coil was positioned so that, as the container passed through the apparatus, the sections were about 0.1 inches above the container top and directly over the container. The other linear sections were positioned about ½ inch below the top of the containers and lateral to the containers.

As the containers passed through the induction sealing apparatus the top portions of the containers were exposed to a pair of overlapping electromagnetic fields on either side of the container top. To assure complete exposure of the container tops to the electromagnetic fields, and to allow the polyethylene liner to attain the correct temperature and to fuse with the plastic part, the containers were rotated about 2.1 times each as they passed through the electromagnetic fields. No extra pressure was placed on the plastic parts before, during or after the movement of the container through the induction sealing apparatus. Upon exiting the apparatus, the containers were allowed to cool and the seals were tested for leakage. The resulting containers were found to have excellent seals. About 100 containers per minute could be sealed in this way.

Thus there has been described a method for induction sealing a plastic part to a composite container using a pair of linear coils electrically connected to low frequency generators. The linear coils produce overlapping electromagnetic fields on either side of the container. Rotating the container as it is exposed to the electromagnetic fields assures even heating of the thermoplastic liner and plastic part. The method produces a reliable seal between the liner and plastic part and can be used at high production speeds.

Other modifications and alternative embodiments of the invention are contemplated which do not depart from the spirit and scope of the invention as defined by the foregoing teachings and appended claims. It is intended that the claims cover all such modifications that fall within their scope.

We claim as our invention:

1. A method for induction sealing a plastic part directly to a composite container, the method comprising the steps of:

providing a composite container having a body, the body having a top portion terminating in a top edge, the body defining a cylinder extending beyond the top edge, the body comprising an outer structural layer, an intermediate layer of electrically conductive material and an innermost layer of thermoplastic adjacent the electrically conductive layer;

positioning a plastic part onto the composite container, the plastic part consisting essentially of non-electrically conductive material, the plastic part comprising a covering portion and a sidewall extending axially from the periphery of the covering portion such that the sidewall is recessed within the composite container and forms a friction fit with the inside of the top portion of the container body;

exposing the top portion of the container body to a pair of electromagnetic fields created by a pair of induction coils arranged in parallel on opposite sides of the container, each coil doubling back on itself so as to form substantially parallel first and second linear sections, the first linear section of each coil being positioned above the container top edge and intersecting the cylinder defined by the container body, the second linear section being positioned below the top edge and lateral to the container body, whereby said exposure induces an electrical current in the electrically conductive layer of the container body, thereby generating heat that raises the temperature of the adjacent thermoplastic layer to a temperature suitable for adhering the thermoplastic layer to the plastic part;

rotating the container while it is being exposed to the electromagnetic fields; and forming a seal between the plastic part and the thermoplastic inner layer of the container by removing the top portion of the container from the electromagnetic fields and allowing the thermoplastic layer to cool and solidify.

2. The method of claim 1 wherein each coil is electrically connected to a separate low frequency electrical generator.

3. The method of claim 1 wherein the first linear section of each coil is about 0.1 inches above the top edge of the container body and the second linear section is about 0.1 to about 0.5 inches below the top edge.

4. The method of claim 3 wherein the second linear section is about 0.1 to 0.25 inches below the top edge.

5. The method of claim 1 wherein the linear sections are about sixteen inches in length.

6. The method of claim 1 wherein, during the exposing step, the container is carried on a moving conveyor belt past the coils.

7. The method of claim 1 wherein the container is rotated by a screw drive.

8. The method of claim 1 wherein the structural layer is paperboard.

9. The method of claim 8 wherein the electrically conductive layer is metallic foil.

10. The method of claim 9 wherein the metallic foil is aluminum foil.

11. The method of claim 1 wherein the plastic part is a lid.

* * * * *